(12) United States Patent
Pietruszynski et al.

(10) Patent No.: US 6,466,528 B1
(45) Date of Patent: Oct. 15, 2002

(54) FLEXIBLE INTERFACE SIGNAL FOR USE IN AN OPTICAL DISK SYSTEM AND SYSTEMS AND METHODS USING THE SAME

(75) Inventors: David Michael Pietruszynski; Wesley Ladd Mokry; Yanning Lu, all of Austin, TX (US)

(73) Assignee: Cirrus Logic, Inc.

( * ) Notice: Subject to any disclaimer, the term of this patent is extended or adjusted under 35 U.S.C. 154(b) by 0 days.

(21) Appl. No.: 09/282,841

(22) Filed: Mar. 31, 1999

(51) Int. Cl.⁷ .................................................. G11B 7/00
(52) U.S. Cl. ................................ 369/44.29; 369/44.12; 360/67
(58) Field of Search ..................... 369/44.41, 44.37, 369/124, 103, 44.12, 44.23, 112.27, 44.36, 44.32, 112.02, 112.17, 112.29, 47.5, 44.35, 53.18, 53.37, 47.24, 124.1–124.13; 360/67; 341/139; 713/323, 324

(56) References Cited

U.S. PATENT DOCUMENTS

| | | | |
|---|---|---|---|
| 4,399,529 A | | 8/1983 | Leterme et al. ........ 369/112.17 |
| 4,707,812 A | * | 11/1987 | Yoshio .................... 369/44.36 |
| 4,856,862 A | * | 8/1989 | Passmore et al. .......... 369/47.5 |
| 5,278,812 A | * | 1/1994 | Adar et al. ............... 369/44.12 |
| 5,519,345 A | | 5/1996 | Farre et al. ................. 327/108 |
| 5,703,759 A | | 12/1997 | Trimberger .................. 361/777 |
| 5,734,637 A | | 3/1998 | Ootaki et al. .......... 369/112.02 |
| 5,901,131 A | | 5/1999 | Ootoki et al. .......... 369/112.02 |
| 5,909,464 A | | 6/1999 | Cohen et al. ................. 375/220 |
| 5,959,953 A | * | 9/1999 | Alon ........................ 369/44.41 |
| 6,134,207 A | * | 10/2000 | Jerman et al. .......... 369/112.29 |
| 6,141,169 A | * | 10/2000 | Pietruszynski et al. ........ 360/67 |
| 6,154,432 A | * | 11/2000 | Faruqi et al. ................ 369/103 |
| 6,204,787 B1 | * | 3/2001 | Baird .......................... 341/139 |

* cited by examiner

Primary Examiner—William Korzuch
Assistant Examiner—Kim-Kwok Chu
(74) Attorney, Agent, or Firm—James J. Murphy, Esq.; Winstead Sechrest & Minick

(57) ABSTRACT

An interface 400 for interfacing an optical pickup 101 is associated with processing circuitry 100. A plurality of inputs receive data retrieved from an optical disk by the pickup and 401, 402, 403 are each coupled to a corresponding one of the inputs and independently activated and deactivated to selectively pass the data to the processing circuitry.

22 Claims, 2 Drawing Sheets

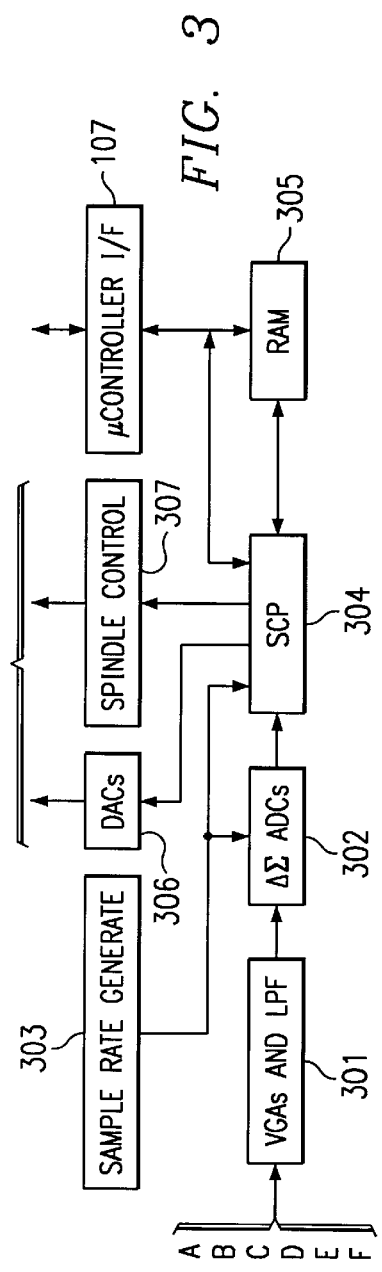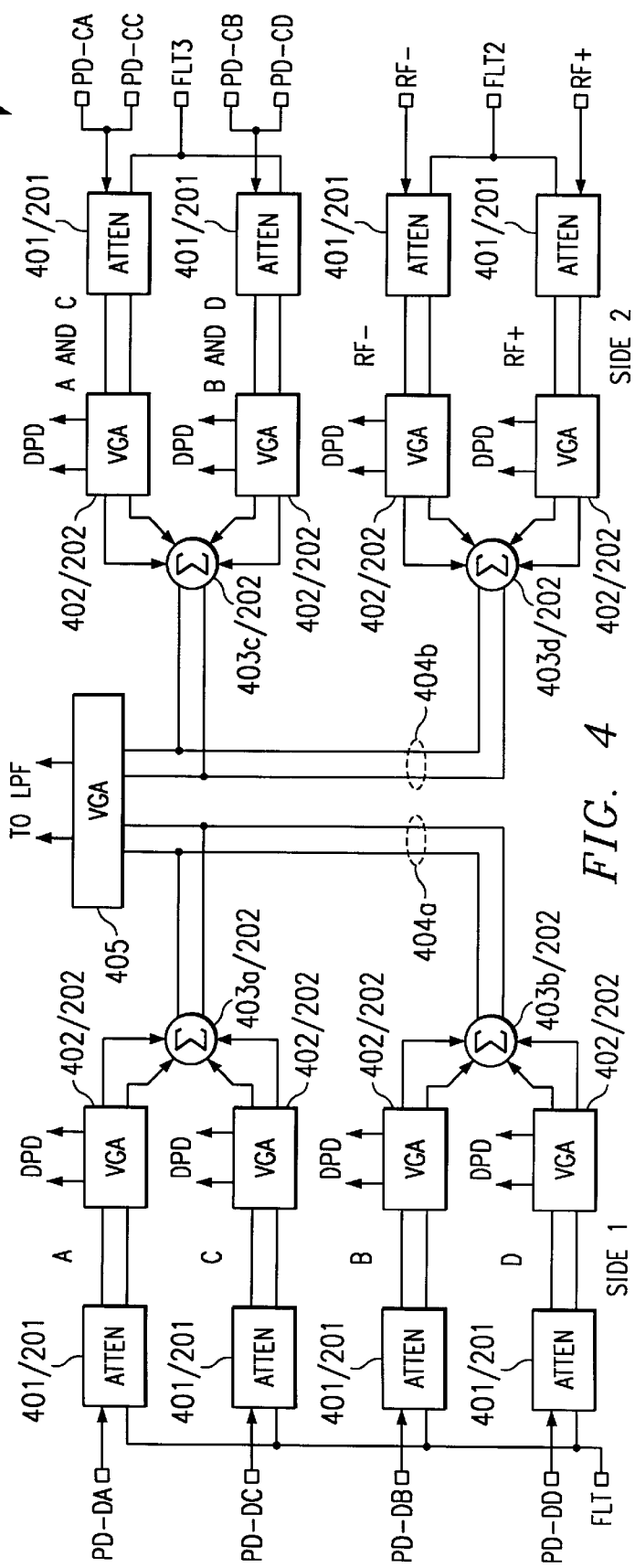

FLEXIBLE INTERFACE SIGNAL FOR USE IN AN OPTICAL DISK SYSTEM AND SYSTEMS AND METHODS USING THE SAME

CROSS-REFERENCE TO RELATED CASES

The following co-pending and co-assigned application contains related information and is hereby incorporated by reference: Ser. No. 08/956,659, entitled "SYSTEMS AND METHOD FOR CONTROL OF LOW FREQUENCY INPUT LEVELS TO AN AMPLIFIER AND COMPENSATION OF INPUT OFFSETS OF THE AMPLIFIER" filed Oct. 23, 1997, and issued Oct. 31, 2000 as U.S. Pat. No. 6,141,169;

Ser. No. 09/282,121, entitled "CIRCUITS AND METHODS FOR EXCHANGING SIGNALS IN OPTICAL DISK SYSTEMS AND SYSTEMS USING THE SAME", filed Mar. 31, 1999, currently pending; and Ser. No. 09/282,804, entitled "CIRCUITS AND METHODS FOR GAIN RANGING IN AN ANALOG MODULATOR AND SYSTEMS USING THE SAME", filed Mar. 31, 1999 and issued as U.S. Pat. No. 6,204,787 B1 on Mar. 20, 2001; and Ser. No. 09/282,849, entitled "SERVO CONTROL LOOPS UTILIZING DELTA-SIGMA ANALOG TO DIGITAL CONVERTERS AND SYSTEMS AND METHODS USING THE SAME" filed Mar. 31, 1999, currently pending.

BACKGROUND OF THE INVENTION

1. Field of the Invention

The present invention relates in general to optical disk systems and in particular, to a flexible signal interface for use in an optical disk system and systems and methods using the same.

2. Description of the Related Art

Optical disks have been used for many years for the mass storage of digital data. Some well known examples of optical disks include digital audio compact disks (CD-DAs), compact disk read-only memories (CD-ROMs) and digital video disks (DVD-RAMs, –ROM, +RW, –RW, CD-R, CD-RWs). Essentially, digital data is stored on a plastic disk as a series of pits in the disk surface. During playback, a beam of light is directed to the rotating disk surface and the intensity of the photons reflected from the pits measured. A modulated electrical signal is generated that can be processed and the data stored on the disk recovered.

A basic configuration for the read (playback) mechanism has developed over a number of years. This configuration includes a pickup or sled which is movable so that a laser, a lens, and array of photodiodes can be positioned directly over the data being read off of the disk. As the disk turns, the photons from the laser are reflected off the pits and received by the photodiodes which generate electrical signals having a current that is proportional to photon density.

The multiple signals output from the photodiodes represent both data detection and servo alignment information. The summation of the high speed data channel signal, which may be composed of the signals A+B+C+D from an astigmatic photodiode array, results in a composite signal with relevant information between approximately 10 KHz and 60 MHz for current DVD players. Servo information contained in these signals however, is at frequencies less than 1 MHz (for current spindle rotation rates of <6000 RPM). Because of these information rates, the data channel signal is sometimes AC-coupled to the data detection and summation circuitry mounted on an accompanying stationary circuit board. Otherwise, some degradation of the dynamic range must be accepted due to the dc content of the incoming signal.

The typical current signal generated by a photodiode is on the order of 1 uA. Transferring this signal directly down a flexible cable to the stationary circuit board therefore would seriously degrade the signal to noise ratio. Hence, transimpedance amplifiers, which convert the current from the photodiode array into a voltage for driving the cable, are mounted in the pickup to minimize noise and interference effects. The data detection, error correction, and servo systems are kept off of the pickup not only because the same interference reasons, but primarily to reduce the physical size and mass of the sled. These systems are mostly digital and switching noise on the pickup may degrade the signal to noise ratio.

There are several different types of optical pickups which are employed depending on the system configuration and performance requirements. Legacy issues also arise with newer systems which require the use of specific pickup for backwards compatibility with older technologies. For example, it may be necessary in a DVD system to use a pickup which is also capable of retrieving data from CD and CD-ROM so that one system can handle all three types of information.

Different types of pickups output different sets of signals. For example, some pickups will combine the high frequency data signals output from the photodiode array for transmission to the fixed processing circuitry as a single signal RF, while other pickups transmit these signals individually. Moreover, some pickups output data and servo control information differentially while others transmit signals in a single-ended fashion, Additionally, some pickups are only used for DVD disks, others for only CD disks, as some for both DVD and CD disks.

Currently, the front-end devices in the fixed processing circuitry are normally customized to be compatible with one, or at least only a very few, types of pickups. This reduces the flexibility of both the system and the pickups, since for the most part they are not freely interchangeable. Hence, what is needed is a flexible way of interfacing different optical pickups with the corresponding fixed processing circuitry.

SUMMARY OF THE INVENTION

An interface is disclosed for interfacing an optical pickup with associated processing circuitry. A plurality of inputs receive data retrieved from an optical disk by the pickup and a plurality of signal paths, each coupled to a corresponding one of the inputs are independently activated and deactivated to selectively pass the data to the processing circuitry. This reconfigurability is done without sacrificing bandwidth.

Embodiments of the present inventive concepts provide a flexible way of allowing a single device or chip to be compatible with different types of optical pickups. These pickups can support differing numbers of output channels, signal summing for different data types (e.g. DVD and CD data).

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a diagram showing further detail of the servo control path shown in FIG. 1; and FIG. 4 is a more detailed diagram of an interface for use between an optical pickup and the data and servo control paths of FIGS. 2 and 3, according to the inventive principles.

DESCRIPTION OF THE PREFERRED EMBODIMENTS

Figure 1:
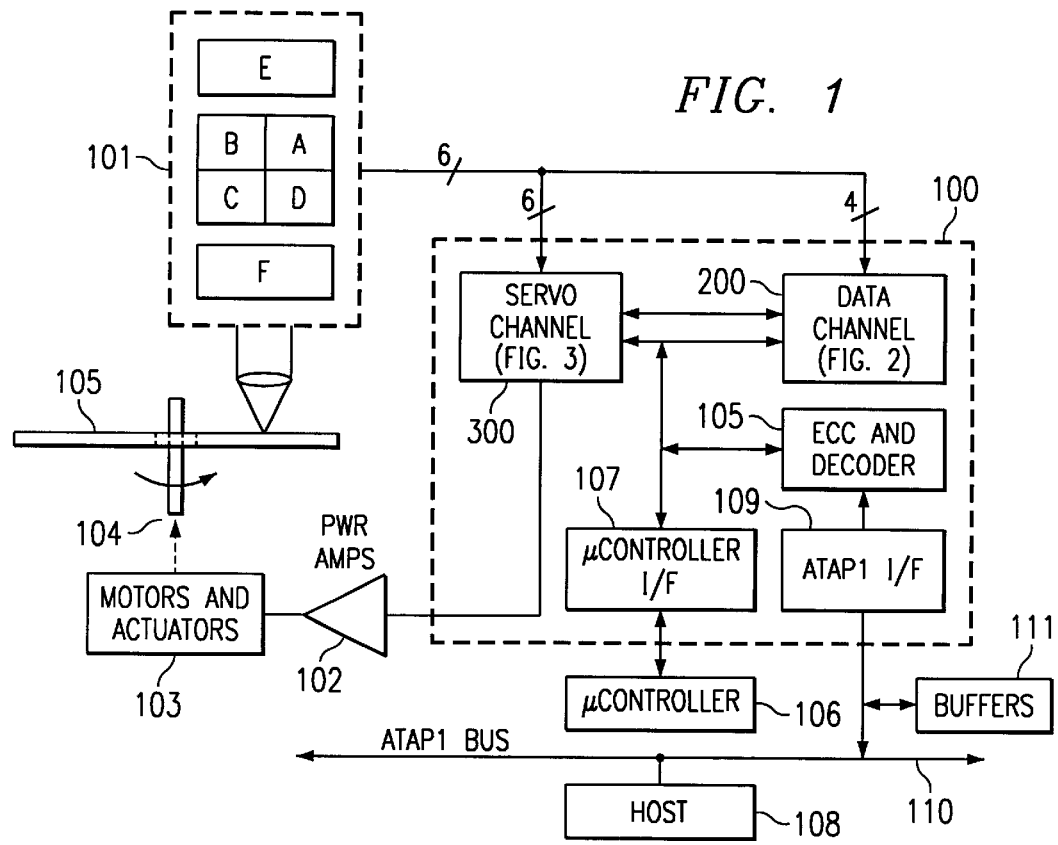
FIG. 1 is a conceptual diagram of an exemplary personal computer based optical disk playback system including a data path including a pickup interface embodying the principles of the present invention.

The principles of the present invention and their advantages are best understood by referring to the illustrated embodiment depicted in FIG. 1–4 of the drawings, in which like numbers designate like parts. FIG. 1 is a conceptual diagram of an exemplary personal computer (PC) based optical disk playback system including a drive manager integrated circuit (IC or "chip") 100 embodying the present inventive concepts. It should be recognized however that IC 100 can also be used with CD or DVD players and DVD RAM systems. In addition to chip 100, the system also includes optical pickup 101, including the requisite laser, photodiode array and transimpedance amplifiers, and the power amplifiers 102 and motors & actuators 103 which control the player spindle 104 rotation and pickup 101 movement and alignment. In the preferred embodiment, drive manager chip 100 embodies decoding circuitry for processing data from either DVD-ROM, CD-ROM or CD-DA optical disks.

There are two principal processing paths, one each for the servo and data channels, the inputs of which are driven by the transimpedance amplifiers on optical pickup 101. The servo path is shown generally at 300 and the data path generally at 200. Each of these paths will be discussed in further detail below in conjunction with FIGS. 3 and 2 respectively. The output of the data channel is passed through ECC and Decoder 105 for additional processing such as error correction and content descrambling.

Local control is implemented by microcontroller 106 through microcontroller interface 107. Typically, local microcontroller 106 is user supplied for maximum flexibility and generally provides the instructions directing the on-board processors and error correction circuitry.

Chip 100 additionally communicates with a host processor 108 via an ATAPI bus interface 109 and ATAPI bus 110, in the case of a PC-based system. The host performs the actual processing of the audio/video information or data retrieved from the disk after error correction and buffering by chip 100. Among other things, the host performs audio and video MPEG decoding and generates the corresponding user interface. Buffers (DRAM) 111 support error correction functions and the streaming of data from chip 100 to host 108.

Figure 2:
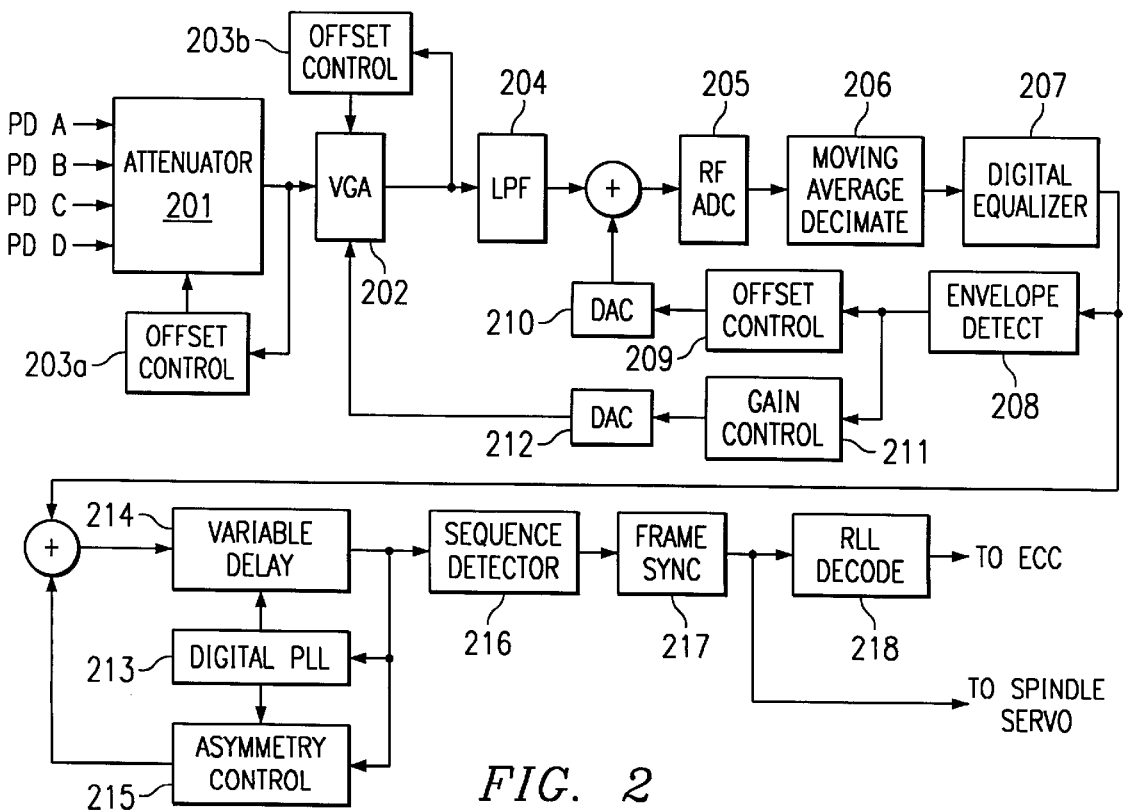
FIG. 2 is a detailed functional block diagram of the data path shown in FIG. 1 including the variable gain amplifiers and attenuators pickup interface.

Referring to FIG. 2 which is a detailed functional block diagram of data path 200, attenuators 201 are used in the preferred embodiment to protect the inputs to following VGAs from damage from any over-voltages produced by the pickup. Offset controls 202a and 203a allow the digital offset control loop discussed below to respond to dc and low frequency baseline offsets in attenuators 201 and VGAs 202.

Data channel summation and variable gain amplifier (VGA) circuitry 202 add one or more signals from the transimpedance amplifiers on pickup 101 to form a composite data signal (e.g., A +B +C +D). Alternatively, the signal addition may be done right on pickup 101, either electrically or optically. The VGA gain is controlled by automatic gain control loops, also discussed below.

A low pass filter (LPF) 204 provides anti-aliasing for flash analog to digital converter 205. A digital moving average of the output of ADCs 205 is taken and filter 206 applied to reject noise and interference in the Nyquist bandwidth, as well as perform a decimation. It should be noted that any one of a number of other types of filters can be used to achieve the same result. The decimating filter 206 can also be used to lower the effective sampling rate of the data for subsequent digital data processing. The data is then digitally equalized using a multiple-tap finite impulse response (FIR) filter 207 adjustable to differing data rates and disk resolutions. Advantageously, the front-end analog circuits are simplified since data is immediately digitized and the necessary equalization is performed digitally.

Automatic offset control is effectuated by the loop including envelope detectors 208, offset controls 209 and DACs 210. Envelope detectors 208 detect both the top and bottom envelopes of the high speed data signal. These envelopes are summed to produce an error signal which is passed through an offset loop compensation filter within offset control block 209 and integrated. The output of the loop compensation filter is converted to analog form by DACs 210 and summed with the output of LPF 204.

Gain control loop 211 also takes the difference between the amplitudes of top and bottom detected envelopes and subtracts a pre-programmed gain value. A gain loop compensation filter integrates the results and produces a linearized signal which is converted by DACs 212 to analog form and passed to VGAs 202 to adjust the signal gain.

An interpolating digital phased-locked loop (DPLL)213 retimes the data after ADC sampling and digital equalization. DPLL 213 operates on sampled amplitudes and generally includes a digital phase error detector, digital loop compensation filter, and digital frequency to phase integrator (digital VCO). Variable delay filter 214 interpolates the asynchronous digital samples to ideal synchronously sampled samples at the front of the DPLL. The phase detector then generates an error signal using a stochastic process which compares the incoming data with ideal target sampling values without noise. The error signal is multiplied by the derivative of the target data to produce phase error estimates. The loop compensation filter performs a proportional integration and the result is sent to variable delay filter 214 to adjust the delay and correct for phase errors.

Advantageously, digital PLL 213 allows the ADC and equalizer to operate at a fixed asynchronous sample rate to the data.

Asymmetry control circuitry 215 includes a control loop which corrects the read errors from the optical pickup. The errors are detected using either the slicer duty cycle or zero crossing errors. The errors are then scaled and integrated by a compensation filter and the resulting compensation signal summed at the input to variable delay filter 214.

The retimed data is then processed by a maximum likelihood sequence detector 216. The partial response equalization target assumed in this detector is $G(D)=1+D+D^2+D^3$.

The output of sequencer 216 is synchronized by frame synchronization circuitry 217 and then passed to Run Length Limit ("RLL") decoder 218. RLL code embedded in the disk is used as an indication of disk defects. Generally, a state machine checks for violation of the RLL code "k-constraint"

and failures in synchronization and then causes the data channel to "coast" through the defect and then resynchronizes the data stream.

Automatic Zone Control (AZC) logic (not shown) takes advantage of the digital nature of the data channel by initializing subsystems based on data rate. For example, the tap weights and tap spacing of the digital equalizer are set to correspond to one of six incoming data rates. Similarly, the loop coefficients, and hence the loop dynamics, of interpolating digital PLL 213 are controlled by the AZC logic.

In sum, the data channel is a bandpass system with signals in the 10 kHz to 60 MHz range. The signal spectrum below 10 kHz is either servo information or external dc offsets from the pickup electronics. The presence of this information reduces the dynamic range and bandwidth of the data channel. Using an off-chip ac coupling capacitor would reduce the dc offset but blocks the low frequency servo information. Instead, the dc signal is brought on-chip and a control loop performs the effective ac coupling for the data channel. Not only are external coupling capacitors unnecessary, but defect detection by the downstream digital processing can freeze this control loop when a defect is reached, unlike an ac coupled system where the baseline wanders. The offset and AGC loops are also frozen until data transitions are detected.

Co-pending and co-assigned application Ser. No. 08/956,569, entitled "SYSTEM AND METHOD FOR CONTROL OF LOW FREQUENCY INPUT LEVELS TO AN AMPLIFIER AND COMPENSATION OF INPUT OFFSETS OF THE AMPLIFIER" filed Oct. 23, 1997, and issued Oct. 31, 2001 as U.S. Pat. No. 6,141,169 contains related information and is hereby incorporated by reference.

Decoder block 105 (FIG. 1) manages the flow of data between the data channel and external DRAM buffer 111 and manages PC host ATAPI interface 109. The ECC circuitry performs realtime ECC correction for DVD data and layered ECC correction for CD-ROM data. Additionally 8–14 demodulation is provided for DVD data and EFM demodulation for error correction and deleaving of CD-DA and CD-ROM data. A burst cutting area (BCA) decoder is built-in chip 100 for DVD-ROM applications. DVD Navigation Play for DVD player operations is supported along with CSS circuitry for descrambling DVD data which has been scrambled under the Content Scramble System. The error correction and decoding functions are supported by on-chip SRAM.

As indicated above, the second principal signal path of the chip 100 controls servo operation and is shown generally at 300 in FIG. 1 and in further detail in FIG. 3. The integrated servo system operates four control loops: focus, tracking, sled, and spindle, using an internal servo control processor requiring little external microcontroller intervention.

Servo data is received from each of the six photodiodes 101 and then amplified by six VGAs 301. As a result, the following ADCs 302 only require 60 dB of dynamic range, because servo VGAs 301 boost the input signal by as much as 28 dB. VGAs 301 also incorporate low pass filtering (LPF) for anti-aliasing. Preferably three pole filters are used with one pole in front of the VGAs and two poles after the VGAs.

Analog to digital conversion is done immediately after low pass filtering such that the analog/digital boundary is as close to the input as possible. An input sampling frequency of 24 MHz (generated on-chip by sample rate generator 303) and a third order delta-sigma modulator reduce digital filter group delay inside the servo loop.

Servo data processing is performed by on-board servo control processor (SCP) 304, which receives its instruction set from the user selected local microcontroller 108 through interface 107 and RAM 305.

Unlike CD systems, DVD servo systems use differential phase detection (DPD) between the photodiode signals D1,D2 (D1=A+C, D2=B+D) for track following and track counting. A digitally intensive adaptive dual arm correlator (ADAC) implemented, this is superior to the conventional DPD methods based on a simple phase detector and analog filters.

Analog control signals are transmitted to power amplifiers 102 through DAC array 306 and spindle controls 307.

FIG. 4 is a more detailed functional block diagram of a flexible interface 400 embodying the principles of the present invention. In this embodiment, the interface is partitioned into two sides labeled Side 1 and Side 2 respectively. Each side in turn comprises four signal paths each including an attenuator 401 and a variable gain amplifier (VGA) 402. Attenuators 401 and variable gain amplifiers are collectively shown in FIG. 2 as blocks 201 and 202 respectively. Each pair of signal paths provides an input to a corresponding summer 403, the outputs of which are coupled to one of two pairs of output lines 404. Signals on output lines 404 are amplified by VGAs 405, followed by an anti-aliasing filter 204 in FIG. 2, passed on to the flash ADCs 205 in the case of data signals. The outputs of VGAs 402 are also sent on to the differential phase detect (DPD) circuitry in the servo path.

Side 1 includes paths A and C which feed one summer 403a and paths B and D, which feed a second summer 403b. On Side 2, paths A & C and B & D feed a summer 403c and paths RF+ and RF− feed a summer 403d. In the illustrated embodiment, signals can be received in either a differential or single-ended form, as will be discussed further below. When signals are received in single-ended form, they are processed as pseudo-differential signals referenced against a reference voltage VREF input at one of the corresponding inputs FLT, FLT2 or FLT3. Typically these FLT inputs will be coupled either to the pickup ground or the fixed circuitry ground.

Each attenuator 401, VGA 402 and summer 403 can be independently activated and deactivated. This can be effectuated by simply setting bits in a configuration register. This allows selected paths to be used for the input of data from a given pickup type and any unused paths to be shut down to save power. Selected summers 403 can be activated when internal summing of data signals is required or deactivated when signal summing is performed on the pickup itself. In the case where the attenuator 401 and VGA 402 are turned-on for a given path while the corresponding summer 403 is turned-off, the signals are sent to the differential phase detect (DPD) circuitry in the servo path for processing and blocked from the rest of the data path. The outputs of summers 403, when used, are implicitly added as currents on lines 404. Some examples of how the deactivation and activation of signal paths of interface 400 can be used to input various signal combinations are illustrated in TABLES 1–8.

TABLE 1 tabulates the states of the various components of each path when signals from four photodiodes of a DVD pickup are individually received by paths A–D and sent to active DPD circuits in the servo path. At the same time, the sum of the output of each of the four photodiodes, generated on the pickup, is received as a differential signal through paths RF+ and RF−. This signal is passed differentially via line pair 404b to the data path.

The case in which two-channels of DVD data are received along with their externally generated (i.e. on the pickup) sum is illustrated by TABLE 2. Here, the inputs to paths C and D are sent to the servo DPD circuitry and the sum received through the RF− and RF+ passed as a differential signal on lines 404b, as was done above.

In TABLE 3, four channels of DVD data are again received and passed to the DPD circuitry through paths A–D. The data signals are also summed on the pickup as was done before, but in this case are delivered to interface 400 as single-ended data at input RF−. The summed signal at RF− is passed to the data path as a pseudo-differential signal referenced against the reference voltage $V_{REF}$.

TABLE 4 describes a configuration where two channels of DVD data are received from the pickup along with their sum. In this case, the data is being received in a single-ended format. Paths B and C are used to drive the servo DPD circuitry and the combined signal used to drive to the data path through signal path RF− (as referenced by the voltage on FLT2).

An internally summed single-ended DVD configuration is described in TABLE 5. In the case of DVD data, signal paths A, B, C, and D are active. When DPD is turned on these data are sent to the servo DPD circuitry. Summer 403 is turned on and four channel data at the inputs DA, DB, DC, and DD are summed and passed to the data path with only DC and DD going to the DPD. For four-channel data, two implicit summations are performed at the inputs DA, DB, DC, and DD and with all data going to the DPD.

The similar cases of externally summed single-ended CD data and externally summed differential CD data are described in TABLES 6 and 7.

In the "worst case", all the inputs are used to support a pickup with both CD and DVD photodiode arrays. In this case, inputs DA–DD are used to receive DVD four-channel DVD data, inputs CA–CD for receiving four-channel CD data and inputs RF+ and RF− for receiving differential (externally summed) DVD data. The signal paths are then activated or deactivated as discussed above depending on the type of optical disk being played-back.

It should be noted that because individual signal paths, as well as the individual circuits (e.g. attenuators, VGAs and summers) can be activated and deactivated, interface 400 is completely flexible. The configurations discussed above are only a few of the possible ways of connecting to and using interface 400. If newer photodiode configurations arise or the end user requires a customized configuration, those configurations can be supported. It should also be noted that the number of signal paths may vary from embodiment to embodiment as required to support advanced and legacy pickups.

TABLE 1

4 Channel DPD Externally Summed Differential DVD

| Input | Path | Attenuator | VGA | DPD | Summer |
|---|---|---|---|---|---|
| DA | A | ON | ON | ON | OFF |
| DB | B | ON | ON | ON | OFF |
| DC | C | ON | ON | ON | OFF |
| DD | D | ON | ON | ON | OFF |
| CA/CC | A & C | OFF | OFF | OFF | OFF |
| CB/CD | B & D | OFF | OFF | OFF | OFF |
| RF+ | RF+ | ON | ON | ON | ON |
| RF− | RF− | ON | ON | ON | ON |
| FLT2 | FLT2 | OFF | OFF | OFF | OFF |
| FLT3 | FLT3 | x | x | x | x | x = Don't care

TABLE 2

2 Channel DPD Externally Summed Differential DVD

| Input | Path | Attenuator | VGA | DPD | Summer |
|---|---|---|---|---|---|
| DA | A | OFF | OFF | OFF | OFF |
| DB | B | OFF | OFF | OFF | OFF |
| DC | C | ON | ON | ON | OFF |
| DD | D | ON | ON | ON | OFF |
| CA/CC | A & C | OFF | OFF | OFF | OFF |
| CB/CD | B & D | OFF | OFF | OFF | OFF |
| RF+ | RF+ | ON | ON | ON | ON |
| RF− | RF− | ON | ON | ON | ON |
| FLT2 | FLT2 | OFF | OFF | OFF | OFF |
| FLT3 | FLT3 | x | x | x | x | x = don't care

TABLE 3

4 Channel DPD Externally Summed Single-Ended

| Input | Path | Attenuator | VGA | DPD | Summer |
|---|---|---|---|---|---|
| DA | A | ON | ON | ON | OFF |
| DB | B | ON | ON | ON | OFF |
| DC | C | ON | ON | ON | OFF |
| DD | D | ON | ON | ON | OFF |
| CA/CC | A & C | OFF | OFF | OFF | OFF |
| CB/CD | B & D | OFF | OFF | OFF | OFF |
| RF+ | RF+ | OFF | OFF | OFF | OFF |
| RF− | RF− | ON | ON | ON | ON |
| FLT2 | FLT2 | $V_{REF}$ | $V_{REF}$ | $V_{REF}$ | $V_{REF}$ |
| FLT3 | FLT3 | x | x | x | x | x = don't care

TABLE 4

2 Channel DPD Externally Summed Single-Ended DVD

| Input | Path | Attenuator | VGA | DPD | Summer |
|---|---|---|---|---|---|
| DA | A | OFF | OFF | OFF | OFF |
| DB | B | OFF | OFF | OFF | OFF |
| DC | C | ON | ON | ON | OFF |
| DD | D | OFF | OFF | OFF | OFF |
| CA/CC | A & C | ON | ON | ON | OFF |
| CB/CD | B & D | OFF | OFF | OFF | OFF |
| RF+ | RF+ | OFF | OFF | OFF | OFF |
| RF− | RF− | ON | ON | ON | ON |
| FLT2 | FLT2 | $V_{REF}$ | $V_{REF}$ | $V_{REF}$ | $V_{REF}$ |
| FLT3 | FLT3 | x | x | x | x | x = don't care

TABLE 5

2 and 4 Channel DPD Internally Summed Single-Ended DVD

| Input | Path | Attenuator | VGA | DPD | Summer |
|---|---|---|---|---|---|
| DA | A | ON | ON | ON | ON |
| DB | B | ON | ON | ON | ON |
| DC | C | ON | ON | ON | ON |
| DD | D | ON | ON | ON | ON |
| CA/CC | A & C | OFF | OFF | OFF | OFF |
| CB/CD | B & D | OFF | OFF | OFF | OFF |
| RF+ | RF+ | OFF | OFF | OFF | OFF |
| RF− | RF− | OFF | OFF | OFF | OFF |
| FLT2 | FLT2 | x | x | x | x |
| FLT3 | FLT3 | x | x | x | x | x = don't care

TABLE 6

Internally Summed Single-Ended CD

| Input | Path | Attenuator | VGA | DPD | Summer |
|---|---|---|---|---|---|
| DA | A | OFF | OFF | OFF | OFF |
| DB | B | OFF | OFF | OFF | OFF |
| DC | C | OFF | OFF | OFF | OFF |
| DD | D | OFF | OFF | OFF | OFF |
| CA/CC | A & C | ON | ON | ON | ON |
| CB/CD | B & D | ON | ON | ON | ON |
| RF+ | RF+ | OFF | OFF | OFF | OFF |
| RF− | RF− | OFF | OFF | OFF | OFF |
| FLT2 | FLT2 | $V_{REF}$ | $V_{REF}$ | $V_{REF}$ | $V_{REF}$ |
| FLT3 | FLT3 | x | x | x | x | x = don't care

TABLE 7

Externally Summed Single-Ended CD

| Input | Path | Attenuator | VGA | DPD | Summer |
|---|---|---|---|---|---|
| DA | A | OFF | OFF | OFF | OFF |
| DB | B | OFF | OFF | OFF | OFF |
| DC | C | OFF | OFF | OFF | OFF |
| DD | D | OFF | OFF | OFF | OFF |
| CA/CC | A & C | OFF | OFF | OFF | OFF |
| CB/CD | B & D | OFF | OFF | OFF | OFF |
| RF+ | RF+ | ON | ON | ON | ON |
| RF− | RF− | OFF | OFF | OFF | OFF |
| FLT2 | FLT2 | $V_{REF}$ | $V_{REF}$ | $V_{REF}$ | $V_{REF}$ |
| FLT3 | FLT3 | x | x | x | x | x = don't care

TABLE 8

Externally Summed Differential CD

| Input | Path | Attenuator | VGA | DPD | Summer |
|---|---|---|---|---|---|
| DA | A | OFF | OFF | OFF | OFF |
| DB | B | OFF | OFF | OFF | OFF |
| DC | C | OFF | OFF | OFF | OFF |
| DD | D | OFF | OFF | OFF | OFF |
| CA/CC | A & C | OFF | OFF | OFF | OFF |
| CB/CD | B & D | OFF | OFF | OFF | OFF |
| RF+ | RF+ | ON | ON | ON | ON |
| RF− | RF− | ON | ON | ON | ON |
| FLT2 | FLT2 | OFF | OFF | OFF | OFF |
| FLT3 | FLT3 | x | x | x | x | x = don't care

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. A circuit for interfacing an arbitrary optical pickup with associated processing circuitry comprising:

a plurality of inputs for receiving data retrieved from an optical disk by said pickup;

a plurality of signal paths each coupled to a corresponding one of said inputs and independently activated and deactivated to selectively pass said data to said processing circuitry; and an independently activated and deactivated summer coupled to a selected pair of said signal paths.

2. The interface of claim 1 wherein each said signal path comprises:

an attenuator; and a variable gain amplifier.

3. The interface of claim 2 wherein outputs of a selected pair of said signal paths are coupled to a summer, said summer independently activated and deactivated.

4. The interface of claim 1 wherein at least one of said paths receives data in a single-ended form and passes such data as a pseudo-differential signal referenced against a received reference signal.

5. The interface of claim 1 where at least first and second ones of said paths receive a differential data signal.

6. The interface of claim 1 wherein at least some of said paths pass compact disk data received from said pickup.

7. The interface of claim 1 wherein at least some of said paths pass digital video disk data received from said pickup.

8. A configurable interface comprising:

a plurality of independently activated and deactivated signal paths each including a variable gain amplifier for selectively inputting signals from a multi-channel photodiode array of an optical disk pickup; and a summer associated with a selected pair of said signal paths for selectively performing an internal summation of corresponding ones of said signals, said summer independently activated and deactivated.

9. The configurable interface of claim 8 wherein selected ones of said paths input single-ended signals carrying high frequency data and low frequency servo control data.

10. The configurable interface of claim 8 wherein a selected pair of said independently activated and deactivated signal paths selectively input a differential signal received from said pickup.

11. The configurable interface of claim 8 and further comprising an attenuator coupling each said variable gain amplifier with a corresponding input terminal.

12. The configurable interface of claim 8 wherein said selected pair of input paths drive servo data processing circuitry when said summer is in an off state.

13. The configurable interface of claim 8 wherein at least one of said signals comprises a signal generated by summing a plurality of signals on said pickup.

14. The configurable interface of claim 8 wherein said plurality of paths are partitioned into first and second sets each driving a corresponding output line.

15. A method of interfacing an optical disk pickup with optical signal processing circuitry comprising the steps of:

coupling outputs of the pickup to inputs of a configurable interface;

coupling selected ones of the inputs to the processing circuitry by activating and deactivating signal paths through the interface associated with each of the inputs to the interface, said step including the substep of selectively activating and deactivating summer circuitry to selectively sum selected ones of the outputs of the pickup.

16. The method of claim 15 and further comprising the step of summing the outputs of selected ones of the signal paths to generate a composite signal for delivery to the processing circuitry.

17. The method of claim 15 wherein the processing circuitry comprises a data path for processing high speed data signals output from the interface.

18. The method of claim 15 and further comprising the steps of:
   summing first and second signals on the optical pickup to generate a composite signal; and
   passing the composite signal to the processing circuitry through a signal path in the interface.

19. An optical disk playback system comprising:
   an optical pickup including an array of photodiodes each outputting a signal;
   a data path for processing high frequency components of the signals output from the photodiodes;
   a servo control path for processing servo control components of the signals output from the photodiodes; and
   an interface for selectively coupling the signals output from the photodiodes to the data and servo control paths comprising:
      a plurality of independently activated and deactivated signal paths each including a variable gain amplifier for selectively coupling the signals from the photodiodes to the data and servo control paths; and
      an independently activated and deactivated summer associated with a selected pair of the signal paths for selectively performing an internal summation of corresponding ones of the signals from the photodiodes.

20. The system of claim 19 and further comprising summing circuitry on the pickup for summing selected signals output from the photodiodes and sending a composite signal to the interface .

21. The system of claim 19 wherein the signals output from the photodiodes are received by the interface as single-ended signals.

22. The system of claim 19 wherein at least one signal output from the photodiodes is received by the interface as a differential signal.

* * * * *

UNITED STATES PATENT AND TRADEMARK OFFICE
CERTIFICATE OF CORRECTION

| | | |
|---|---|---|
| PATENT NO. | : 6,466,528 B1 | Page 1 of 1 |
| APPLICATION NO. | : 09/282841 | |
| DATED | : October 15, 2002 | |
| INVENTOR(S) | : David Michael Pietruszynski, Wesley Ladd Mokry and Yanning Lu | |

It is certified that error appears in the above-identified patent and that said Letters Patent is hereby corrected as shown below:

At column 1, line 9, delete "08/956,659" and insert -- 08/956,569 --.

At column 1, line 19, delete "09/282,804" and insert -- 09/282,840 --.

Signed and Sealed this

Twenty-first Day of July, 2009

JOHN DOLL
*Acting Director of the United States Patent and Trademark Office*